United States Patent [19]
Britton

[11] Patent Number: 5,577,746
[45] Date of Patent: Nov. 26, 1996

[54] FOLDING TRANSPORT VEHICLE

[75] Inventor: Daniel W. Britton, Alberta, Canada

[73] Assignee: 634182 Alberta Ltd., Alberta, Canada

[21] Appl. No.: 437,660

[22] Filed: May 9, 1995

Related U.S. Application Data

[63] Continuation-in-part of Ser. No. 107,877, Aug. 18, 1993, Pat. No. 5,474,316.
[51] Int. Cl.$^6$ ................................................. B62K 27/12
[52] U.S. Cl. ....................................... 280/204; 280/648
[58] Field of Search ................................. 280/202, 204, 280/7.12, 7.14, 30, 32, 18, 19, 639, 645, 647, 648, 656, 651, 652, 653

[56] References Cited

U.S. PATENT DOCUMENTS

| | | | |
|---|---|---|---|
| 3,118,553 | 1/1964 | Rosenzweig | 280/651 X |
| 3,271,048 | 9/1966 | Beesley et al. | 280/204 |
| 5,020,814 | 6/1991 | George et al. | 280/204 |
| 5,176,395 | 1/1993 | Garforth-Bles | 280/204 X |
| 5,259,634 | 11/1993 | Berner et al. | 280/204 |
| 5,301,963 | 4/1994 | Chen | 280/30 |
| 5,318,318 | 6/1994 | Berner et al. | 280/204 |

*Primary Examiner*—Kevin Hurley
*Attorney, Agent, or Firm*—Bennett Jones Verchere

[57] ABSTRACT

A transport vehicle has an upper frame, a chassis and a pair of folding frame units. The vehicle may be folded into compact position by collapsing the folding frame units allowing the rotation of the upper frame toward the chassis. The vehicle is easy to manufacture and offers a simplified folding procedure over previously known vehicles. The vehicle may used as a trailer, a stroller or a sled and may be convertible therebetween.

10 Claims, 8 Drawing Sheets

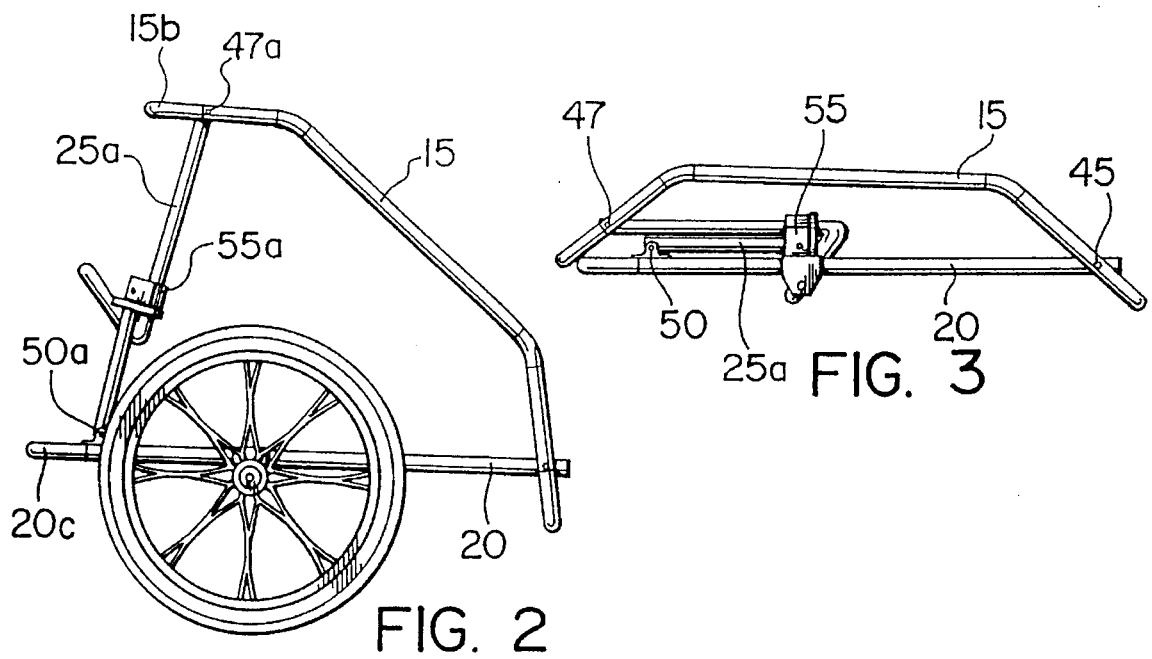
FIG. 2
FIG. 3
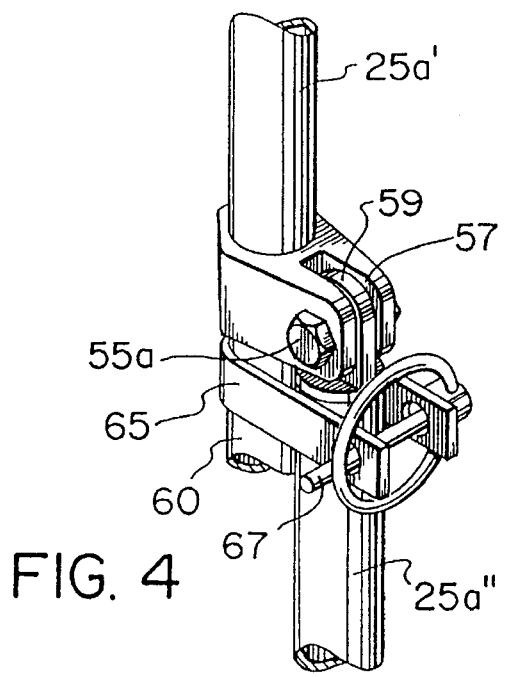
FIG. 4

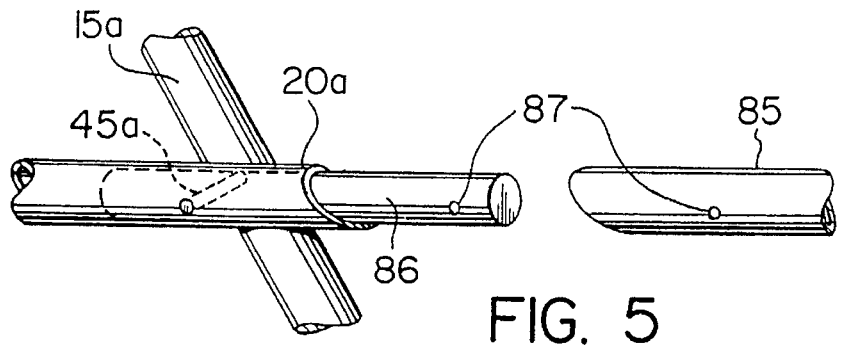
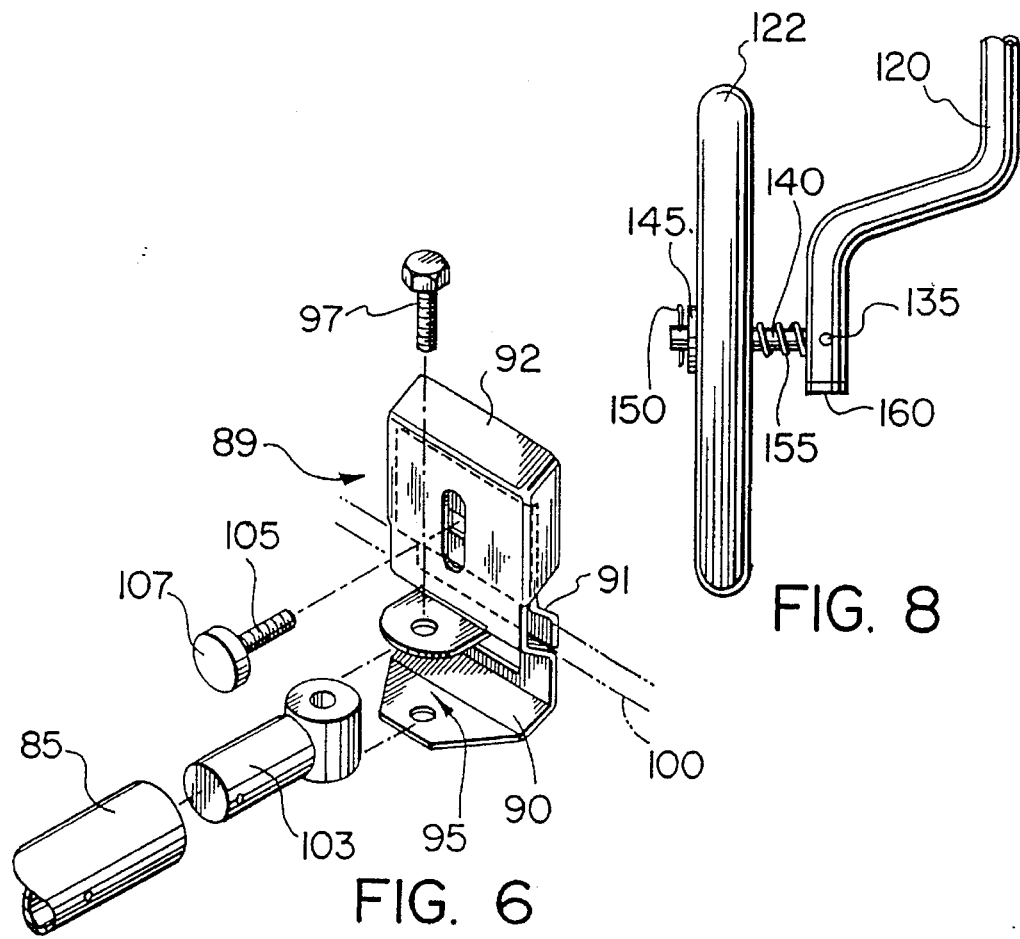

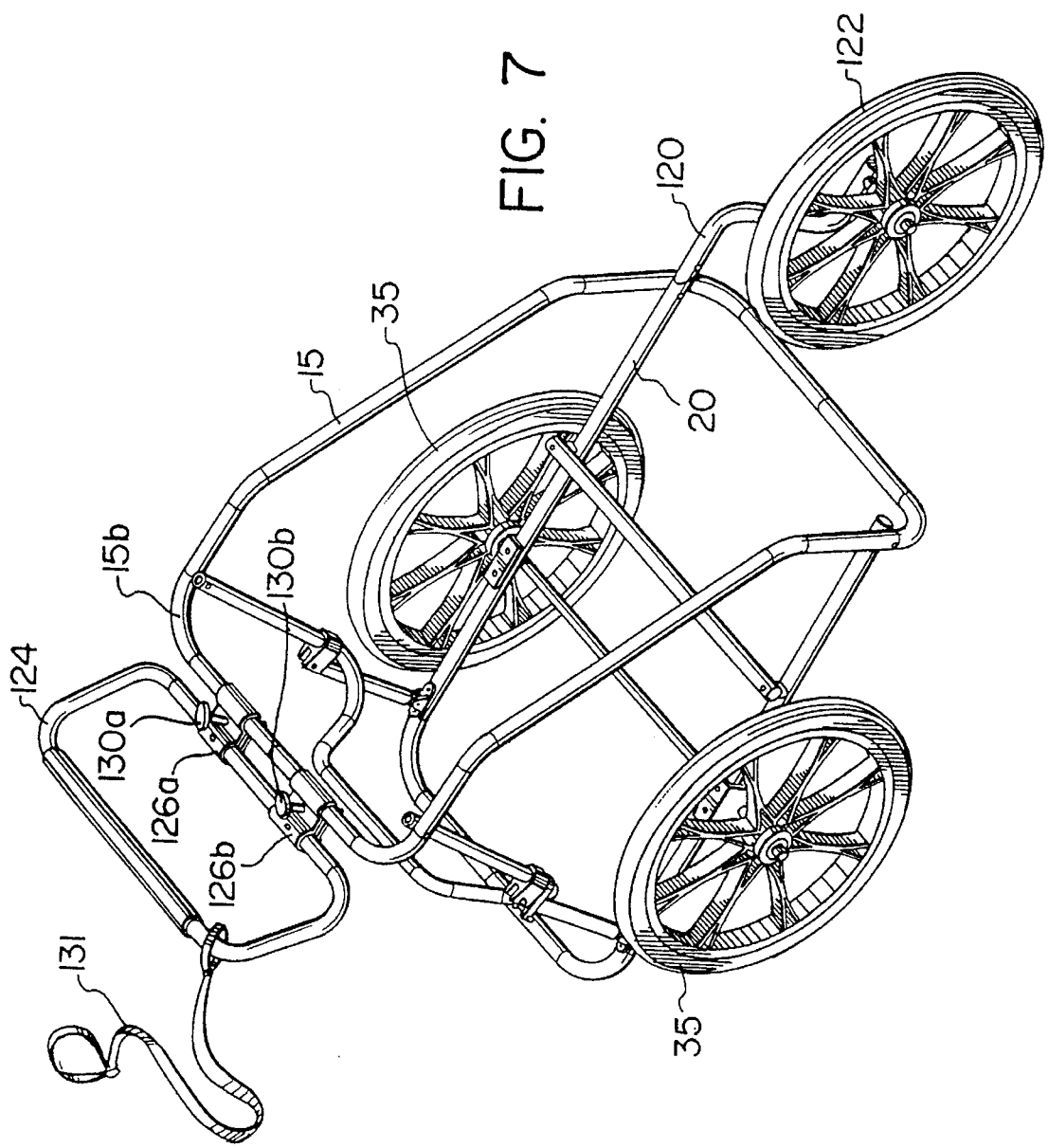

5,577,746

FOLDING TRANSPORT VEHICLE

RELATED PATENT APPLICATION

This is a continuation-in-part application of application Ser. No. 08/107,877 filed Aug. 18, 1993, U.S. Pat. No. 5,474,316.

FIELD OF THE INVENTION

The present invention is directed toward folding transport vehicles and, in particular, toward folding transport vehicles adapted for transporting children or cargo.

BACKGROUND OF THE INVENTION

Trailers for use with bicycles are well known in the art. Such trailers are useful for carrying small children or for transporting goods. As is taught in U.S. application 08/107,877, the trailers must offer durability and safety while being small and easily stored. Some trailers fold into compact size for storage but often these trailers are complex to manufacture which increases the cost to the consumer. In addition, collapsing the trailer into the compact position is often labour intensive and time consuming.

To enhance the usefulness of these trailers, some have been adapted for conversion into strollers by replacement of a hitch with a stroller wheel.

SUMMARY OF THE INVENTION

A folding transport vehicle has been developed which is easy to manufacture, thereby reducing costs, and offers a simplified collapsing procedure. The vehicle can be formed as a trailer, such as for towing behind a bicycle, a stroller or a sled and can be made convertible therebetween.

According to a broad aspect of the present invention there is provided a folding transport vehicle comprising:
  a lower chassis;
  an upper frame, formed of at least one elongate member and defining substantially an upper limit of a cargo compartment, the upper frame being pivotally connected to the chassis adjacent its first end;
  at least one folding frame unit, each folding frame unit having a first end and an opposite end, the first end of each folding frame unit being pivotally connected to the chassis and the opposite end of each folding frame unit being pivotally connected to the upper frame,
  each folding frame unit having a pivot point such that the folding frame unit is foldable from an extended position to a collapsed position allowing the upper frame to rotate towards the chassis and thereby fold the trailer into a compact position; and,
  a displacement means.

According to a further aspect of the present invention there is provided a folding trailer adapted for towing by a bicycle comprising:
  a lower chassis;
  an upper frame, formed of at least one elongate member and defining substantially an upper limit of a cargo compartment, the upper frame being pivotally connected to the chassis adjacent its first end;
  at least one folding frame unit, each folding frame unit having a first end and an opposite end, the first end of each folding frame unit being pivotally connected to the chassis and the opposite end of each folding frame unit being pivotally connected to the upper frame,
  each folding frame unit having a pivot point such that the folding frame unit is foldable from an extended position to a collapsed position allowing the upper frame to rotate towards the chassis and thereby fold the trailer into a compact position;
  a hitch arm and a hitch member for attachment to the bicycle extending forwardly of the chassis; and,
  a plurality of wheels.

DESCRIPTION OF THE INVENTION

The vehicle of the present invention is formed to be useful for transporting cargo or children and is collapsible for storage. The vehicle comprises a chassis, an upper frame pivotally connected thereto and at least one folding frame unit pivotally connected therebetween. Each folding frame unit has a pivot point such that it can be folded to allow the upper frame to rotate relative to the chassis. In the operative position, the folding frame units are disposed in an extended position and the upper frame is pivoted away from the chassis. To collapse the vehicle the folding frame units are folded about their pivot points to thereby rotate the upper frame toward the chassis.

The folding frame unit is formed of any suitable structural members such as tubing, plates, bars or rods formed of any suitable material such as, for example, steel, aluminum or plastic. The pivot point can be any suitable pivotal connection such as, for example, a hinge or clevis.

The folding frame unit is provided between the upper frame and the chassis such that when the folding frame unit is moved into an extended position the upper frame is pivoted away from the chassis. The upper frame can be held in this extended position by overcentering the pivotal connection of the folding frame unit or providing a locking means in association with the folding frame unit.

The upper frame is formed from at least one elongate member. The elongate members can be formed of any elongate structural members such as, for example, rods, bar stock or tubing formed of any suitable material such steel, aluminum, or plastic. The upper frame defines substantially the upper limits of the cargo compartment and can support, if desired, a cover formed of flexible sheet materials such as, for example, fabric. The upper frame can be shaped to in any suitable way using any configuration of elongate members to obtain a desired appearance or to adjust the volume of the cargo compartment. A preferred vehicle is useful for the transport of children. In this preferred vehicle, the upper frame is formed to withstand stresses such as would occur if the trailer were to overturn.

The chassis supports the upper frame and folding frame units and defines substantially the lower limits of the cargo compartment. The chassis must also be formed to withstand the stresses of use.

In one embodiment the chassis is formed as an arrangement of elongate members. The elongate members can support a rigid floor member or a cover formed of flexible sheet materials, such as fabric or nylon. In another embodiment the chassis is formed as a molded plastic shell of any suitable plastic materials such as polyethylene or polypropylene. Such a molded shell can be formed using any suitable technique such as vacuum or injection molding. Preferably, the molded shell is constructed to be self supporting, requiring no further reinforcement such as by elongate members.

The vehicle can be adapted for use as a trailer, a stroller or a sled depending on the displacement means employed. For example, wheels and a hitch can be attached to the vehicle rendering it useful as a trailer such as for towing behind a bicycle. Alternatively, the vehicle can have attached skis for use as a sled, such as for towing by a skier or pushing by a skater. In another embodiment, the vehicle can be used as a stroller by having attached thereto at least three wheels. In a preferred embodiment, the vehicle is modified to accept hitch arms, wheels, skis and stroller attachments interchangeably, thereby rendering it convertible between a trailer, a stroller and a sled.

BRIEF DESCRIPTION OF THE DRAWINGS

For a better understanding of the present invention, reference may be made by way of example to the following diagrammatic drawings in which:

FIG. 2 is a side view of the trailer of FIG. 1 in the operative position with the hitch removed;

FIG. 3 is a side view of the trailer of FIG. 1 in the folded compact position with the wheels and hitch removed;

FIG. 4 is a perspective view of the pivot point of the folding frame units of FIG. 1;

FIG. 5 is a perspective view of the attachment site of the hitch arm to the lower frame member;

FIG. 6 is an exploded perspective view of the hitch of the trailer of FIG. 1;

FIG. 7 is a perspective view of a modified version of the present invention which is useable as a stroller;

FIG. 8 is a plan view of the wheel connection of the stroller shown in FIG. 7;

DETAILED DESCRIPTION OF THE PREFERRED EMBODIMENTS

Figure 1:
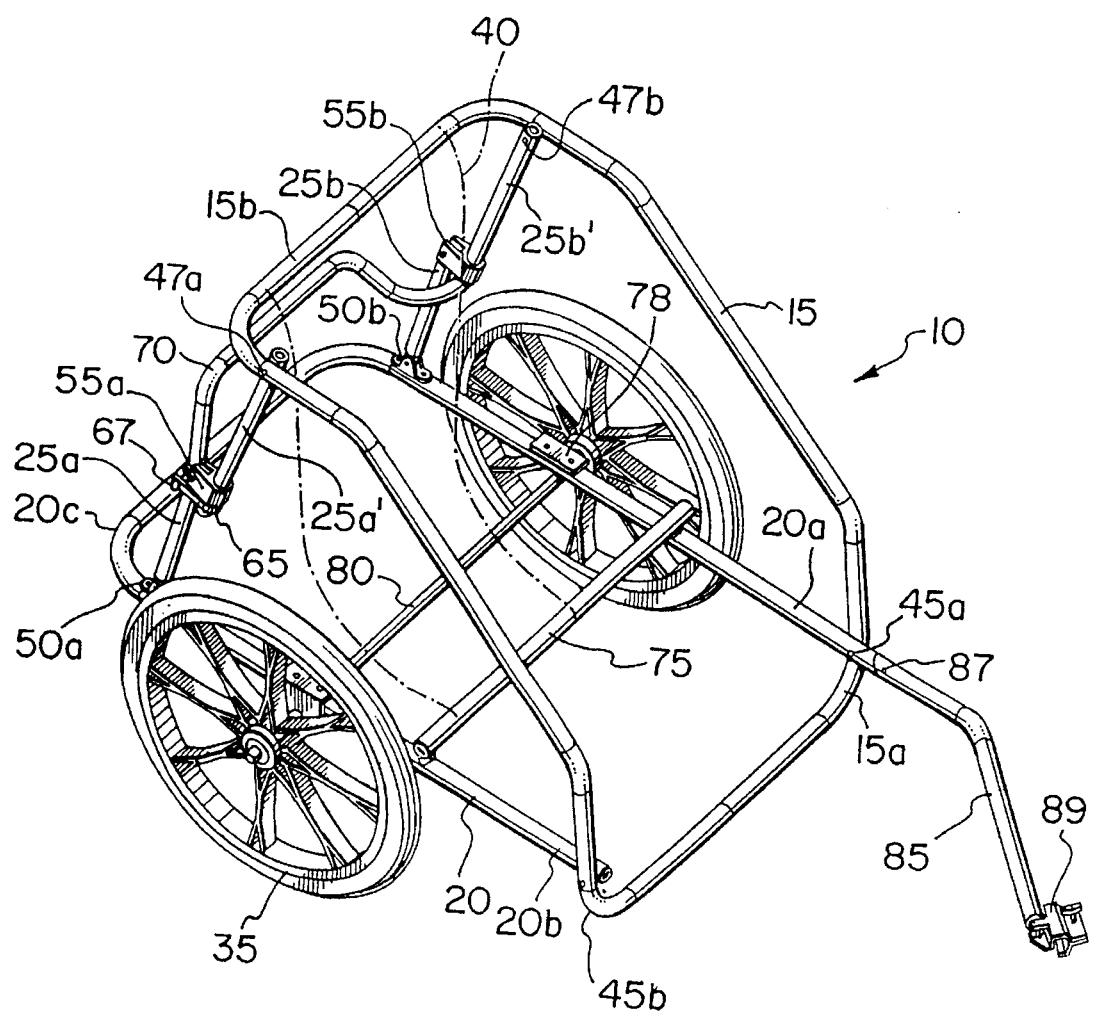
FIG. 1 is a perspective view of an embodiment of a folding trailer of the present invention.

As shown in FIG. 1, a trailer 10 of the present invention comprises an upper frame member 15, a lower frame member 20 and a pair of folding frame units 25a, 25b. The trailer further comprises wheels 35, or other displacement means such as skiis (not shown).

Upper frame member 15 is preferably substantially rectangular in plan view having a forward end 15a and a rear end 15b. The upper portion of the trailer's cargo compartment is defined by upper frame member 15. Preferably, lower frame member 20 is substantially U-shaped in plan view. The open arms 20a, 20b of the U-shaped, lower frame member 20 extend out forwardly of the rear end 20c. Lower frame member 20 defines the lower portion of the cargo compartment. A selected one of the arms (in this case 20a) extends out further than the other to allow for attachment of the hitch arm 85. Forward end 15a of upper frame member 15 is pivotally connected to arms 20a, 20b of lower frame member 20 as shown at 45a and 45b. Connections 45a, 45b allow the rotation of upper frame member 15 relative to lower frame member 20.

Folding frame units 25a, 25b are substantially identical, each having a first end and an opposite end. The first end of each folding frame unit 25a, 25b is pivotally connected adjacent rear end 15b of upper frame member 15, as shown at 47a and 47b. Each of the opposite ends of folding frame units 25a, 25b is pivotally attached adjacent rear end 20c of lower frame member 20, as shown at 50a and 50b. Folding frame units 25a, 25b, when extended, act to maintain rear end 15b of upper frame member 15 at a predetermined distance from rear end 20c of lower frame member 20, as shown in FIGS. 1 and 2. This is the preferred operative position of the trailer.

Each folding frame unit 25a, 25b has two members pivotally connected at 55a and 55b. Connections 55a, 55b are positioned such that folding frame units 25a, 25b are foldable from the extended position to a collapsed position. As shown in FIG. 3, when folding frame unit 25a collapses, and folding frame unit 25b (not shown in FIG. 3) collapses in the same way, then pivotal connections 45, 47, 50 allow upper frame member 15 to rotate towards lower frame member 20.

Pivotal connections 45, 47, 50, 55 may be any suitable means such as screws or rivets. The connections should be durable, capable of repeated use and able to withstand stress. Pivotal connections 50a and 50b are preferably marine fittings, having raised journals extending from lower frame member 20 and accommodated in jaws fitted onto folding frame units 25a, 25b. Pivotal connections 55a and 55b of the folding frame units 25a, 25b are preferably as shown enlarged in FIG. 4. Pivot point 55a, shown in FIG. 4, is positioned to define an upper member 25a' and a lower member 25a" on folding frame unit 25a. In the preferred embodiment, upper member 25a' is offset from lower member 25a" and pivot 55a takes the form of a marine fitting having a jaw 57 which accommodates a flattened portion 59 of lower member 25a". The flattened portion 59 is maintained in the jaw 57 by a pivotal pin 55a. Each folding frame unit 25a may have an extension 60 on a selected member (in this case 25a'), such that when the folding frame units are extended, extension 60 will come to bear on the adjacent member 25a" to prevent hyper extension at pivot 55a. A similar arrangement is used with respect to pivotal connection 55b. Still referring to FIG. 4, accidental collapse of the folding frame units 25a, 25b can be prevented by fitting a lock 65 at a selected one of pivotal connections 55a, 55b. Preferably, lock 65 is a U-shaped clip (as shown) adapted to fit around extension 60 and adjacent member 25a". Clip 65 is held in place by a releasable pin 67 such as a lynch pin. Clip 65 can, of course, be made integral with the jaw of the preferred pivotal connection 55a, if desired.

Referring back to FIG. 1, in a preferred embodiment the upper members 25a', 25b' of folding frame units 25a, 25b are joined by a cross bar 70. Cross bar 70 may be formed as a continuation of extensions 60. The cross bar 70 provides stability for the trailer and may further be used as a handle to aid in the collapsing procedure. Folding frame units 25a, 25b are biased outwardly, when the trailer is in the operative position, by the tension created by a fabric cover (not shown) which is retained as by being wrapped around and snap fastened in place over frame 15 on one side and which is stretched downwardly, around frame 20 on that side (with a suitable hole for axle 80) under bars 75 and 80, around frame 20 on the other side (again with a hole for axle 80), and is wrapped around and snap fastened over frame 15 on the other side. The fabric cover can suitably have a rear flap which snaps in place around bar 70, and is secured in front by being snap fastened around frame 15*a*. Besides tensioning units 25*a* and 25*b* outwards, the fabric cover prevents an occupant of the trailer from catching an arm or leg in the wheels 35.

The trailer may be further stabilized by extending a stabilizing bar 75 across open arms 20*a*, 20*b* of lower frame member 20.

To reduce the size of the folded trailer, lower frame member 20 is preferably narrower than upper frame member 15 such that upper frame member 15 fits over lower frame member 20 when the trailer is folded. Folding frame units 25*a*, 25*b* are positioned so as not to obstruct the rotation of upper frame member 15 during folding. Preferably, forward end 15*a* and rear end 15*b* of upper frame member 15 are angled downwardly, as is best seen in FIG. 2. This modification provides protection to cargo should the trailer tip during use and increases the size of the cargo compartment.

The frame members may be constructed of any suitable materials, for example tubing or solid rods, which provide adequate strength and durability. Preferably, the frame is constructed of aluminum tubing. Suitable tubing for the upper and lower frame members is 1" OD tubing with a 0.062" wall thickness while tubing of ⅞ OD is suitable for the folding frame units.

Displacement means 35 may be, as shown in FIG. 1, wheels. However, it is also envisioned that skiis may replace the wheels. Wheels 35 are supported on a common axle 80 which extends between journals 78 attached to lower frame member 20. The wheels may be provided with "quick release" fixtures to aid in their removal during the collapsing process. Quick release fixtures may be for example lynch pins.

A seat member 40, shown in phantom in FIG. 1, may be positioned in the trailer for carrying passengers. Alternatively, the seat member may be replaced by a floor (not shown) when the transport of cargo is desired. Seat member 40 is formed by securing a suitable material, such as for example fabric, to frame members. Preferably, the fabric will extend from rear end 15*b* of upper frame member 15 to have attachment at wheel journals 78 by means of grommets and finally to be secured to stabilizing bar 75. Shock absorption for the seat can be provided by suitable shock absorption means, such as springs or rubber inserts, located between stabilizing bar 75 and lower frame member 20 or between the seat 40 and bar 75. The trailer of the present invention may be fitted with a protective rain shield as is known in the art.

Referring again to FIG. 1, in the preferred embodiment the trailer is adapted to be towed behind a bicycle (not shown). The trailer is hitched to a chain stay of the bicycle and, preferably, the left chain stay. A hitch arm 85 is attached to an extension of a selected arm (in this case 20*a*) of the lower frame member 20. Hitch arm 85 is preferably formed from 1" aluminum tubing.

The hitch arm connection is the site of much stress and preferably is adapted to withstand such stress. Referring to FIG. 5, preferably the hitch arm 85 is slotted into the lower frame member arm 20*a* by means of a inner reinforcement 86 adapted to be inserted between the end of arm 20*a* and the hitch arm 85. The inner reinforcement 86 is maintained in the arm 20*a* by aligning and cooperating with connection 45*a* while the inner reinforcement is maintained in the hitch arm 85 by a pin (not shown) which extends through aligned apertures 87 in the hitch arm 85 and reinforcement 86. To distribute the load at the connection over a greater area, the ends of arm 20*a* and hitch arm 85 are preferably made to mate in an angled arrangement as shown in FIG. 5. Preferably, the inner reinforcement is formed from ¾" cold rolled steel.

A resilient hitch member 89 is attached at the end of hitch arm 85 for engagement with the bicycle chain stay. Referring to FIG. 6, preferred hitch member 89 comprises a collar arrangement 90 for pivotal connection to chain stay 100 (shown in phantom) and a clevis 95 for pivotal connection with hitch arm 85. Clevis 95 is preferably formed from sheet steel. Hitch arm 85 is maintained in clevis 95 by a bolt 97. In the preferred embodiment, a polyurethane adaptor 103 is inserted at the end of the hitch arm 85 and is held in the clevis 95 by bolt 97. The polyurethane adaptor 103 should be abrasion resistant. For example, polyurethane of hardness 95 Shore A is suitable. The flexible properties of the polyurethane material of the adapter 103 allow increased flexibility at the clevis attachment as compared to the simple insertion of the rigid material of the hitch arm directly into the clevis. The flexibility of the adapter can be enhanced by forming a hollowed region in the adaptor where it is inserted into the hitch arm 85.

Collar arrangement 90 is comprised of a back collar segment 91 and a front collar segment 92. Front collar segment 91 and back collar segment 92 are adapted to encircle chain stay 100 when they are brought together. To maintain the collar segments 91, 92 in position on the chain stay 100, a bolt 105 is inserted through aligned apertures on the collar segments 91, 92. A knob 107 is threaded on bolt 105 adjacent the front collar segment 92 to allow manual adjustment of the collar segments about chain stay 100. It is preferred that the collar arrangement be formed from sheet steel such that collar segments 91, 92 take the form of plates which are bent to fit about chain stay 100. The clevis 95 is firmly connected to the collar arrangement 90 and preferably is formed from a tongue bent upward from front collar segment 92 which coacts with the rest of segment 92, as shown.

Referring to FIG. 7, the trailer may be modified to form a stroller. To accomplish this, the previously described hitch arm is replaced with a wheel arm 120. Wheel arm 120 is attached to the extension of a selected arm of lower frame member 20 in a like manner to the two embodiments previously described in regards to the hitch arm. To provide additional stability at the connection a clamp (not shown) can be positioned to surround the connection. Wheel arm 120 has releasably attached thereto a wheel 122 by means of for example a releasable lynch pin as will be shown in more detail in FIG. 8. To provide stability to the stroller, the wheel 122 is preferably of similar size to the pair of wheels 35 attached to the frame. A handle 124 is attached to rear end 15*b* of upper frame member 15 by means of clips 126*a*, 126*b*. Handle 124 is of suitable length to provide adequate apace for the stride of the person pushing the stroller. Clips 126*a*, 126*b* having adjustable knobs 130*a*, 130*b*, allow the handle 124 to be rotated and adjusted to various heights. When not in use the handle 124 may be rotated out of the way. The handle may alternatively be attached by means of a tubular member connector. To prevent accidental release of the stroller during use, a safety strap 131 formed of nylon of polyester webbing may be attached to the handle 124. The safety strap 131 is adapted to be fitted on the wrist of the user.

The wheel 122 is attached to the wheel arm 120 as shown in FIG. 8. A bolt 135 attaches an axle member 140 to the wheel arm 120. The wheel 122 is maintained on the axle 140 by means of a washer 145 and lynch pin 150 arrangement. A spring 155 is biased on the axle 140 and maintains the wheel 122 in position against the washer 145. An end cap 160 fits into the open end of the wheel arm 120.

Figure 9:
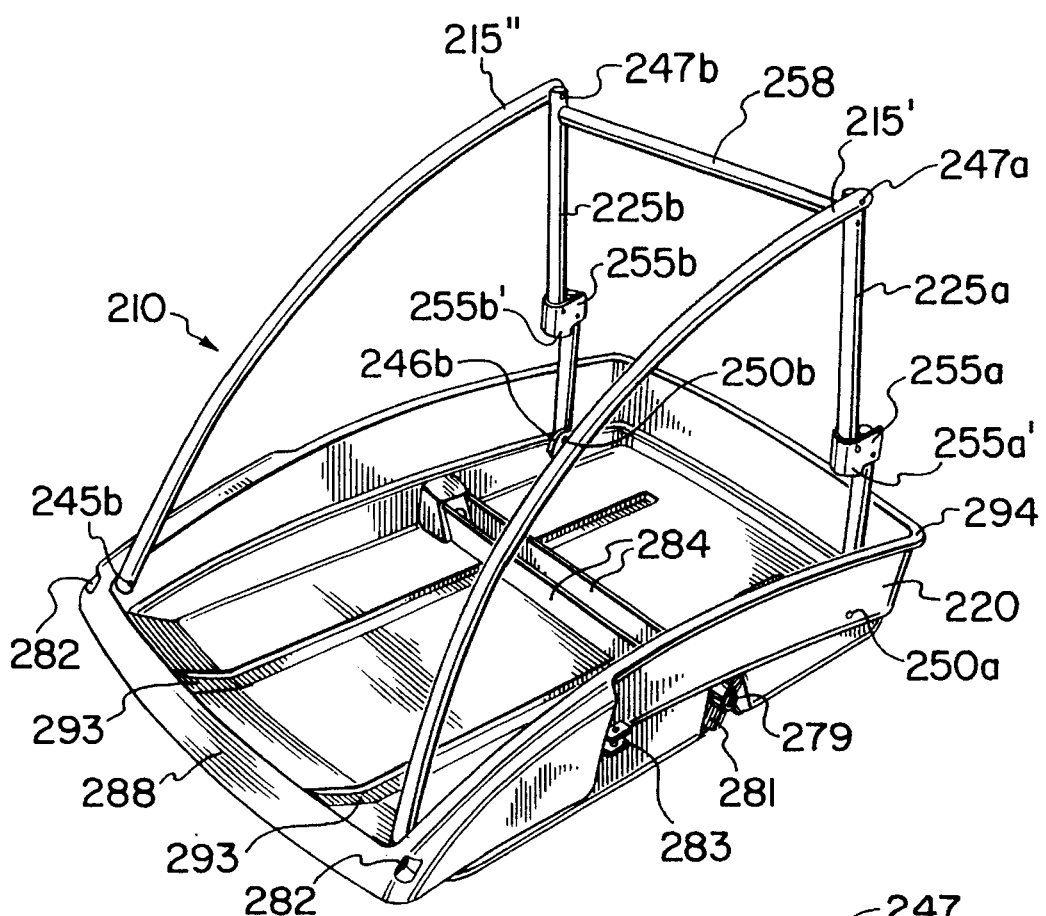
FIG. 9 is a perspective view of a convertible folding vehicle according to the present invention.

Referring to FIG. 9, a transport vehicle 210 is shown. Vehicle 210 comprises a lower chassis 220, a pair of folding frame units 225a, 225b and an upper frame formed as a pair of elongate members 215', 215". Each elongate member 215', 215" is attached to one of folding frame units 225a, 225b at pivotal connections 247a, 247b, respectively. A cross bar 270 is secured between folding frame units 225a, 225b. Folding frame units 225a, 225b have pivotal connections 255a, 255b. Pivotal connections 255a, 255b are formed with abutting portions 255a', 255b' to prevent over-extension of folding frame units 225a, 225b. In the preferred embodiment, upper frame and folding frame units are formed of 1" OD aluminum tubing with a 0.062" wall thickness.

Chassis 220 is molded of plastic and provides a rigid floor and lower walls. Preferably, chassis 220 is formed of injection molded, high density polypropylene to be generally at least ⅛" in thickness. Chassis 220 is formed to support and provide for connection of elongate members 215', 215", through apertures (not shown) for accepting pivotal pin connections 245a, 245b (only connection 245b can be seen in FIG. 9), and folding frame members 225a, by clevis arrangements 246a, 246b (only clevis 246b can be seen) for accepting pivotal pin connections 250a, 250b. Chassis 220 is further formed to provide for connection of wheels (not shown in FIG. 9) through hollow sleeves 279, if desired. Reinforcement ribs 281 are formed about sleeves 279. Sleeves 279 extend out from the side of the chassis and act as a spacer for wheel attachment. Chassis 220 is further formed to provide for connection of a hitch arm or stroller attachment (not shown in FIG. 9) through openings 282 and clevis 283, if desired. Preferably, openings are formed to conform to the shape of the hitch arm so that stresses on the hitch arm are absorbed by the opening. Openings 282 and clevis 283 are provided at each side of the vehicle for connection of left-side or right-side hitch arms or stroller or hitch arrangements which are secured to the vehicle at both sides. Preferably, clevis arrangements 246, 283 and sleeves 279 are molded integral with chassis 220.

Chassis 220 is formed to include lateral reinforcing ribs 284 which can also act to accommodate an axle (not shown) which extends between the wheels, if such a wheel attachment is desired. A cowling 288 is formed about the front portion of chassis 220 to provide additional strength to the chassis as well as for aesthetic purposes. Ribs 293 and flange 294 also act to strengthen and reinforce the chassis.

Figure 10:
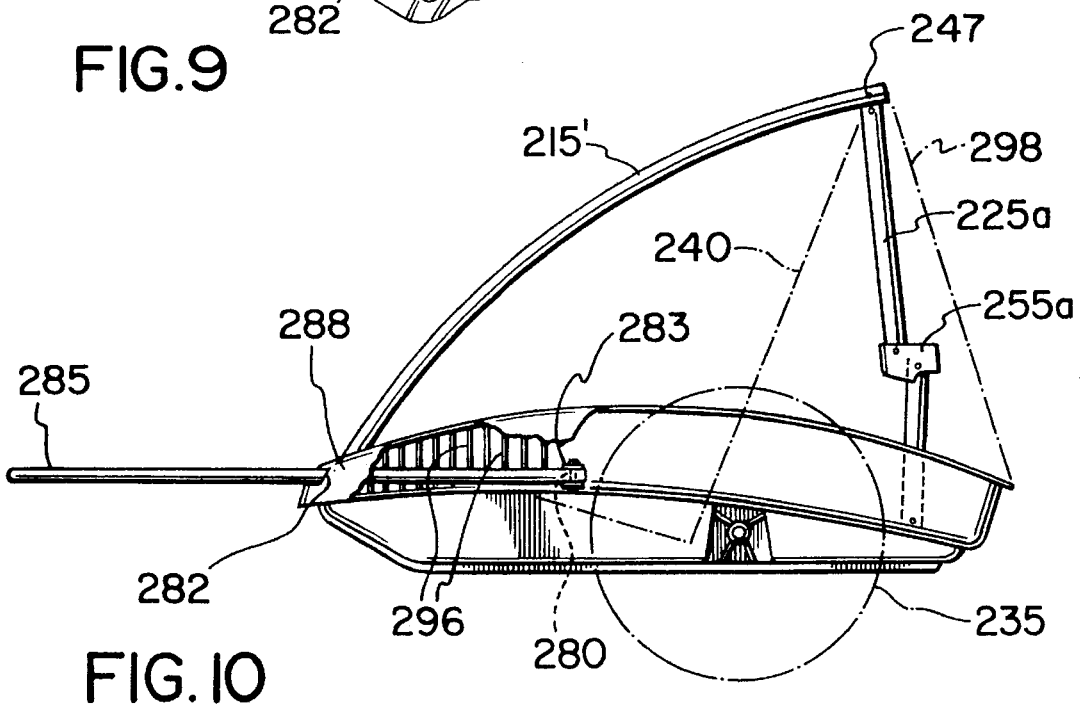
FIG. 10 is a side view of the vehicle of FIG. 9 with a portion of the cowling cut away and having wheels and a hitch arm attached.

Referring to FIG. 10, vehicle 210 is shown with wheels 235, shown in phantom, and hitch arm 285 attached. Hitch arm 285 is inserted through opening 282 and extends to be engaged to clevis 283 by a pin 280. Cowling 288 has been cut away to reveal ribs 296. Each rib 296 forms a web between chassis and the underside of cowling 288. Ribs 296 extend down such that they are in contact with a hitch arm 285 (or stroller attachment not shown) when it is inserted through opening 282 and provide for absorbtion of forces from the hitch arm. Hitch arm 285 is preferably formed to have a cross sectional shape, for example square or rectangular, which prevents twisting of the hitch arm by abutment against opening 282 and ribs 296, thereby reducing wear at clevis 283. Further ribs and flanges can be added or modified to strengthen and reinforce the chassis, as desired. Preferably, the chassis is formed as a single molded member and is self supporting thereby avoiding the need for support by elongate members.

A fabric cover 298, shown in phantom, is preferably secured on the vehicle to extend about elongate members 215', 215" and folding frame units 225a, 225b and is attached in any suitable way to chassis 220. A slung seat 240, shown in phantom, is preferably also provided.

Figure 11A:
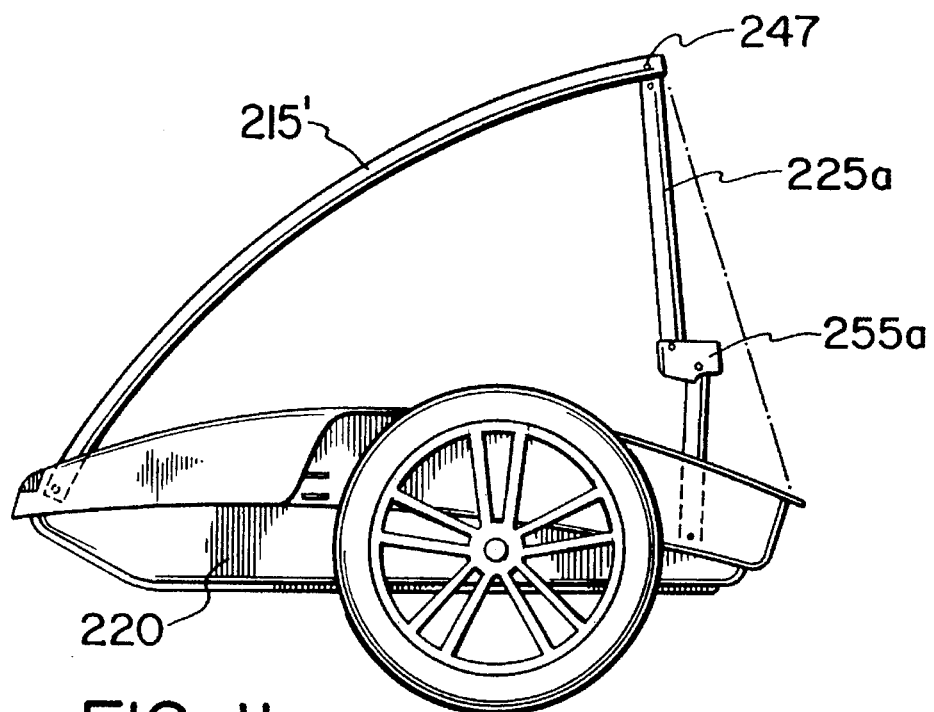
FIG. 11A is a side view of the vehicle of FIG. 10 in the operative position with the hitch arm removed.
Figure 11B:
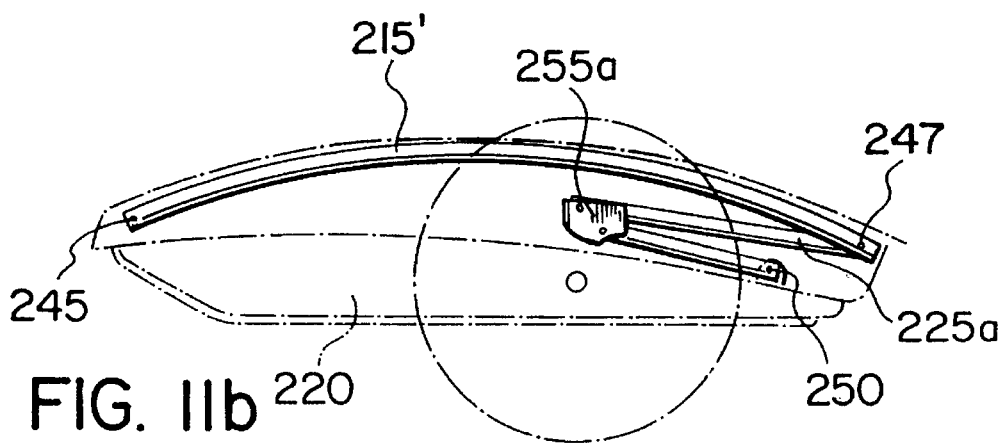
FIG. 11B is a side view of the vehicle of FIG. 9 in the folded compact position.

As best seen in FIGS. 11A and 11B, the vehicle can be folded from an operative position (FIG. 11A) into a compact position (FIG. 11B) by collapsing folding frame unit 225a, and folding frame unit 225b (not shown in FIGS. 11A and 11B) about their pivotal connections 255a, 255b, respectively. When folding frame units 225a, 225b are collapsed, pivotal connections 245, 247 and 250 allow elongate members 215', 215" to rotate towards chassis 220, shown in phantom in FIG. 11B. Chassis 220 is preferably formed to accommodate the elongate members within its walls.

Figure 12:
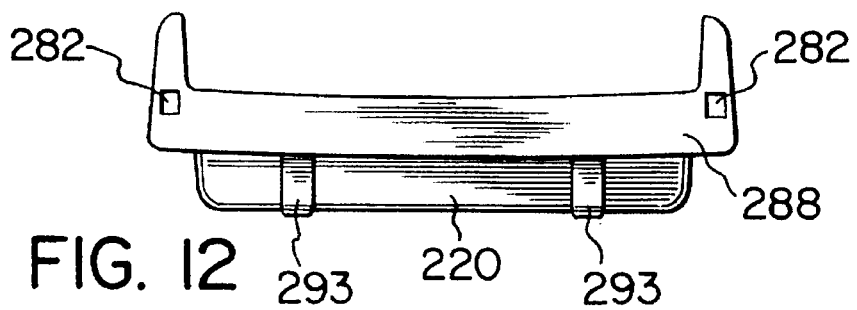
FIG. 12 is a front view of a chassis useful in the present invention.

Vehicle 210 is useful as a trailer, as shown in FIG. 10, for towing behind a bicycle by attachment of wheels 235 and a hitch arm 285 having a bicycle hitch attached thereto, such as, for example, that hitch shown FIG. 6. In another embodiment, the vehicle can be used as a stroller by employing stroller attachments, such as those shown in FIGS. 7 and 8. In yet another embodiment, the vehicle can be used as a sled for towing, such as by a skier, by use of skiis and a suitable hitch arm, similar to that shown in FIG. 10, with a body harness attached thereto. To facilitate use as a sled, ribs 293 are formed to extend outwardly from the bottom of chassis 220 to act a skiis, as best seen in FIG. 12. Alternatively, skis can be attached at sleeves 279. The vehicle can be made to be only a selected one of a stroller, a trailer or a sled. In a preferred embodiment, the vehicle is adapted to accept hitches, wheels, skis and stroller attachments interchangeably and thereby be convertible therebetween.

Figure 13A:
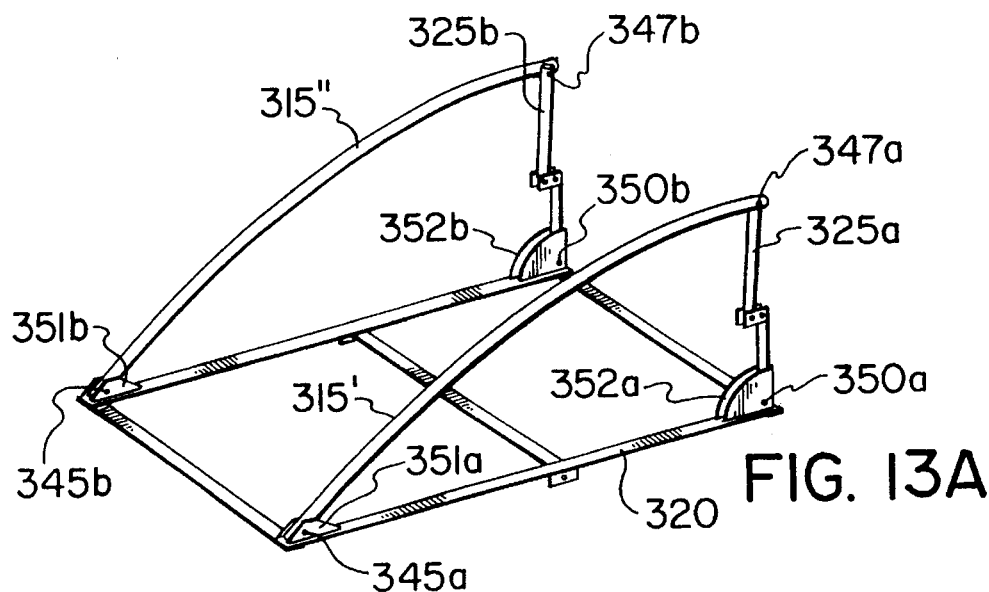
FIGS. 13A–13F are perspective views of further embodiments of vehicles according to the present invention.

FIGS. 13A to 13F show some illustrative embodiments of vehicles according to the present invention without displacement means attached thereto. FIG. 13A shows a vehicle having an upper frame comprised of a pair of elongate members 315', 315". Each elongate member is attached to the chassis 320 at a first end by pivotal connections 345a, 345b. The opposite end of each elongate member is attached to a folding frame unit 325a, 325b at pivotal connections 347a, 347b. Folding frame units 325a, 325b are attached to chassis 320 at pivotal connections 350a, 350b. Pivotal connections 350a, 350b, 345a, 345b are surrounded by guide plates 351a, 351b, 352a, 352b which laterally stabilize the elongate members and the folding frame units.

Figure 13B:
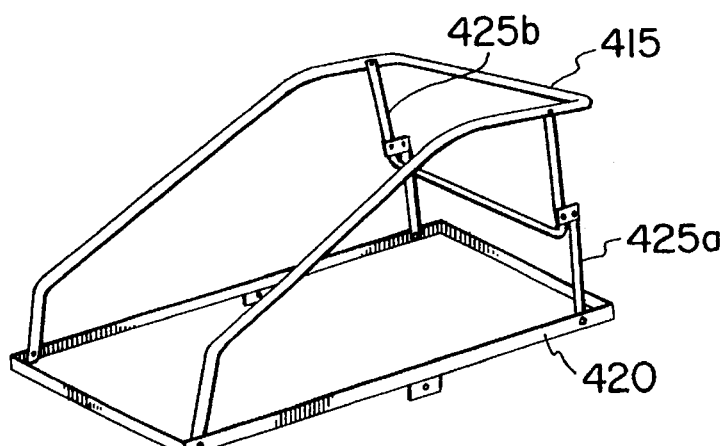

FIG. 13B shows a vehicle having an upper frame formed as a U-shaped elongate member 415. The upper frame is pivotally connected to a chassis 420 and a pair of folding frame units 425a, 425b.

Figure 13C:
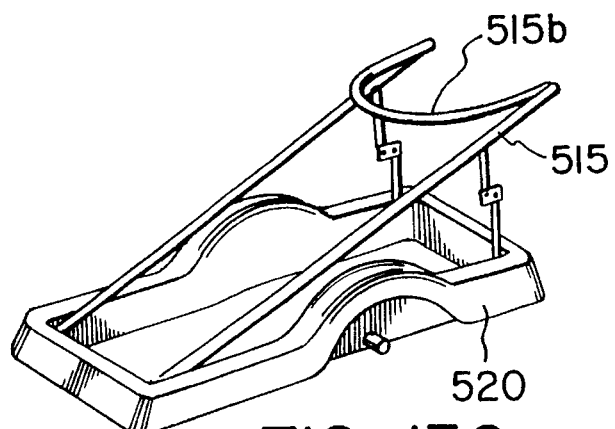
Figure 13D:
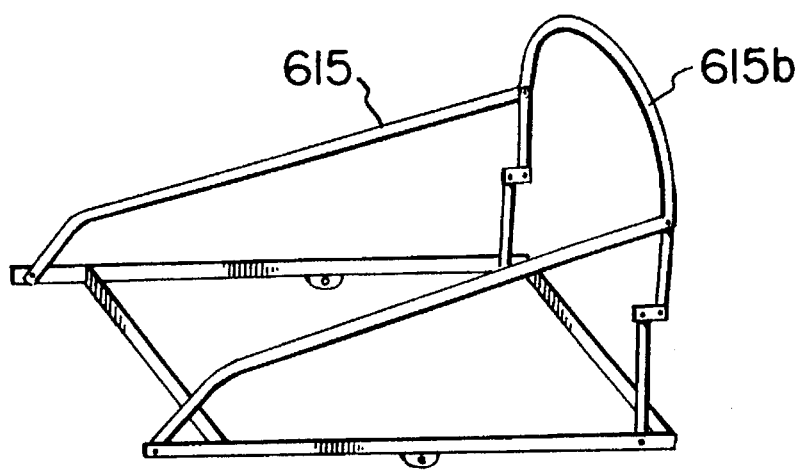

FIGS. 13C and 13D show other embodiments of a vehicle having upper frames formed of generally U-shaped members. U-shaped upper frame member 515, 615 shown in FIGS. 13C and 13D, respectively, are formed at their bases 515b, 615b to increase the volume of their cargo compartments. The vehicle of FIG. 13C has a chassis 520 formed of vacuum molded plastic.

Figure 13E:
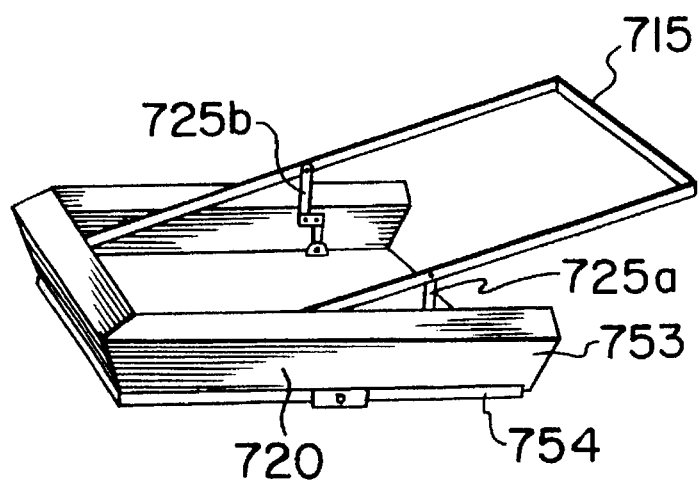

FIG. 13E shows a vehicle having a chassis 720 formed of a molded plastic shell 753 and an undercarriage 754 formed of elongate members. Folding frame units 725a, 725b are positioned between chassis 720 and upper frame 715.

Figure 13F:
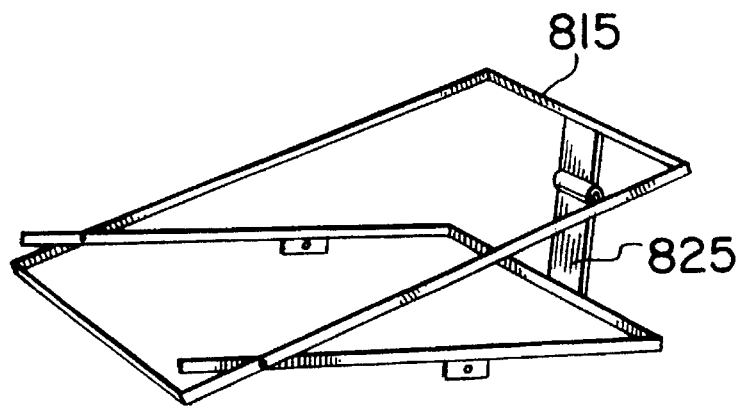

FIG. 13F shows a vehicle having a rectangular shaped upper frame 815. A single folding frame unit 825 is pivotally connected at 847 and 850 between upper frame 815 and chassis 820.

FIGS. 13A–13F show only the exemplary embodiments of vehicles of the present invention in which the folding frame units, upper frame and chassis have been modified in their positioning, shape and construction to obtains vehicles having different appearances and cargo compartment volumes while retaining the inventive collapsing feature of the vehicle.

It will be apparent that many other changes may be made to the illustrative embodiments, while falling within the scope of the invention and it is intended that all such changes be covered by the claims appended hereto.

I claim:

1. A folding transport vehicle comprising:

a lower chassis defining substantially a lower limit of a cargo compartment and having a first end;

an upper frame, formed of at least one elongate member and defining substantially an upper limit of the cargo compartment, the upper frame being pivotally connected to the chassis adjacent the first end;

at least one folding frame unit, each folding frame unit having a first end and an opposite end, the first end of each folding frame unit being pivotally connected to the chassis and the opposite end of each folding frame unit being pivotally connected to the upper frame, each folding frame unit having a pivot point such that the folding frame unit is foldable from an extended position to a collapsed position allowing the upper frame to rotate towards the chassis and thereby fold the vehicle into a compact position; and, a displacement means.

2. The folding vehicle of claim 1 further comprising a hitch arm extending forwardly from the lower frame member for placing the vehicle in tow.

3. The folding vehicle of claim 2 wherein the displacement means are wheels.

4. The folding vehicle of claim 2 wherein the displacement means are skiis.

5. The folding vehicle of claim 1 wherein the displacement means are at least three wheels.

6. The folding vehicle of claim 1 wherein the vehicle is convertible between a stroller, having at least three wheels, a trailer, having a hitch arm and at least two wheels and a sled, having skis and a hitch.

7. The folding vehicle of claim 1 wherein the chassis is formed as a molded plastic shell.

8. A folding trailer adapted for towing by a bicycle comprising:

a lower chassis defining substantially a lower limit of a cargo compartment and having a first end;

an upper frame, formed of at least one elongate member and defining substantially an upper limit of the cargo compartment, the upper frame being pivotally connected to the chassis adjacent the first end;

at least one folding frame unit, each folding frame unit having a first end and an opposite end, the first end of each folding frame unit being pivotally connected to the chassis and the opposite end of each folding frame unit being pivotally connected to the upper frame, each folding frame unit having a pivot point such that the folding frame unit is foldable from an extended position to a collapsed position allowing the upper frame to rotate towards the chassis and thereby fold the trailer into a compact position;

a hitch arm and a hitch member for attachment to the bicycle extending forwardly of the chassis; and, a plurality of wheels.

9. The folding trailer of claim 7 wherein the chassis is formed as a molded plastic shell.

10. The folding trailer of claim 7 wherein the trailer comprises a pair of folding frame units and a cross bar extending between the folding frame units; and, the upper member being formed as a pair of elongate members, each member being pivotally connected to the chassis adjacent its first end and pivotally connected to one of the folding frame units adjacent its opposite end.

* * * * *